Oct. 1, 1929.  J. E. MILLER  1,730,230
DENTAL FORCEPS
Filed March 16, 1926

Inventor
J. E. Miller.
By [signature]
Attorney

Patented Oct. 1, 1929

1,730,230

UNITED STATES PATENT OFFICE

JOHN EDWARD MILLER, OF HUNTINGTON, WEST VIRGINIA

DENTAL FORCEPS

Application filed March 16, 1926. Serial No. 95,076.

This invention relates to dental forceps.

It is aimed to provide a novel construction which will permit the extraction of any tooth of the upper jaw at a saving of practically one-half in time and power, and which will not crush the teeth or roots thereof and will not lacerate the gums.

The invention resides in the particular construction shown in accompanying drawings and hereinafter described and claimed.

In said drawings:—

Figure 2:
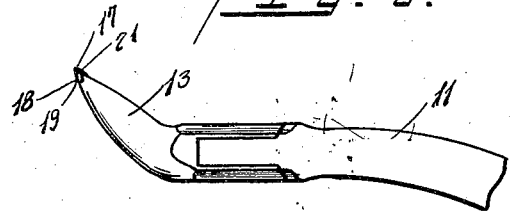
Figure 2 is a fragmentary elevation of the forceps.
Figure 3:
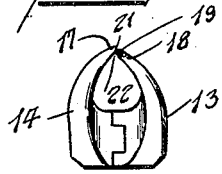
Figure 3 is an end elevation of the forceps.

Referring specifically to the drawings, the forceps are conventionally of usual form in that they comprise handles or levers 10 and 11 pivotally connected together at 12, and each being provided with a beak 13 and 14, respectively, in plan being generally arcuate and having recesses or cavities 15 and 16, respectively, in their facing surfaces. As best seen in Figure 2, the beaks extend from the handles at an angle of approximately 30°. Also, it is to be noted that the beaks are generally conical at their bases nearest the pivot 12.

Figure 1:
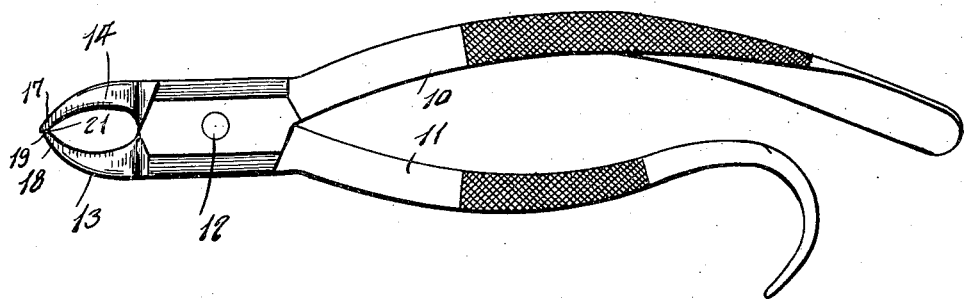
Figure 1 is a view in plan of forceps equipped with my improvements.
Figure 4:
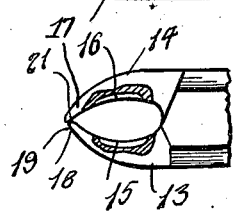
Figure 4 is a fragmentary plan view of the forceps at the beaks and partly broken away.
Figure 5:
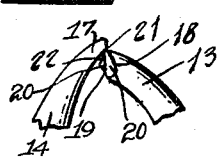
Figures 5 and 6 are detail perspective views of one of the beaks.
Figure 6:
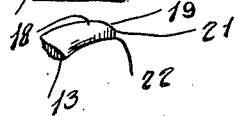

The beak 14 has its gripping point or extremity extending substantially longitudinally as at 17. The coacting gripping point 18 of the lever 10, terminates slightly short of the distal extremity of the point 17, as shown in Figures 1 and 4 and is cut off along a line substantially transverse of the longitudinal axis of the implement, providing a flat surface as at 19. In addition, the beak 13 at its forward end and from opposite sides is cut away on lines extending upwardly and forwardly as at 20 to provide a tooth engaging point at 21 and, relative to the position of the tool shown in the accompanying drawings, a straight vertical tooth-gripping line or edge at 22, such edge serving to engage the tooth better than a mere point.

It will be noted that the point 21 and edge 22 are located rearwardly of the free end of beak 14. The tooth of course is gripped by the line 21 in conjunction with the extremity 17 of the beak 14. Such gripping enables the device to be used for extracting all teeth of the upper jaw and at the same time by the expenditure of approximately half the power and energy on the part of the dentist, in half the time, without breaking or unduly crushing the tooth or root and without lacerating the patient's gum.

Various changes may be resorted to provided they fall within the spirit and scope of the invention.

I claim as my invention:—

1. Dental forceps comprising relatively movable levers having coacting beaks, one of the beaks terminating short of the distal extremity of the other beak and having a gripping edge facing the other beak.

2. Dental forceps comprising relatively movable levers having a beak, one of the beaks terminating short of the other beak and having a gripping edge facing the other beak, one of the beaks being cut away in a plurality of directions to provide said edge.

3. Dental forceps having relatively movable levers each provided with a beak, one of said beaks being cut away transversely on a line in the rear of the free extremity of the other beak.

4. Dental forceps comprising relatively movable levers, each of said levers having a beak, one of the beaks having a tooth-engaging edge rearwardly of the other beak and adapted to engage the tooth along a line transverse to the path of movement of the beak.

In testimony whereof I affix my signature.

JOHN EDWARD MILLER.